United States Patent
You (10) Patent No.: US 8,740,398 B2
(45) Date of Patent: Jun. 3, 2014

(54) CAMERA FLASH MODULE

(75) Inventor: Jae Sung You, Suwon-si (KR)

(73) Assignee: Samsung Electronics Co., Ltd., Seoul (KR)

(*) Notice: Subject to any disclaimer, the term of this patent is extended or adjusted under 35 U.S.C. 154(b) by 0 days.

(21) Appl. No.: 13/540,127

(22) Filed: Jul. 2, 2012

(65) Prior Publication Data
US 2013/0003342 A1    Jan. 3, 2013

(30) Foreign Application Priority Data

Jul. 1, 2011 (KR) .......................... 10-2011-0065442

(51) Int. Cl.
*G03B 15/02* (2006.01)
*F21V 5/00* (2006.01)

(52) U.S. Cl.
USPC .................. 362/16; 362/310; 362/3; 362/329

(58) Field of Classification Search
USPC ......... 362/310, 11, 16, 17, 311.02, 3, 249.02, 362/329; 396/176
See application file for complete search history.

(56) References Cited

U.S. PATENT DOCUMENTS

| | | | |
|---|---|---|---|
| 6,554,452 B1 * | 4/2003 | Bourn et al. ................... | 362/247 |
| 7,046,926 B2 * | 5/2006 | Chikugawa .................... | 396/175 |
| 7,221,864 B2 * | 5/2007 | Seo ................................ | 396/176 |
| 7,352,011 B2 | 4/2008 | Smits et al. | |
| 7,379,117 B2 * | 5/2008 | Hwang .......................... | 348/371 |
| 7,675,085 B2 * | 3/2010 | Sorg .............................. | 257/99 |
| 7,733,415 B2 * | 6/2010 | Kojima ......................... | 348/371 |
| 8,113,690 B2 * | 2/2012 | Lin ................................ | 362/285 |
| 8,385,735 B2 * | 2/2013 | Awazu .......................... | 396/236 |
| 2004/0146292 A1 * | 7/2004 | Kawakami .................... | 396/200 |
| 2005/0162543 A1 * | 7/2005 | Kobayashi .................... | 348/371 |
| 2008/0260372 A1 * | 10/2008 | Shin .............................. | 396/176 |
| 2011/0141733 A1 * | 6/2011 | Senn ............................. | 362/235 |

FOREIGN PATENT DOCUMENTS

KR   10-2007-0063313 A   6/2007
KR   10-2008-0024031 A   3/2008

* cited by examiner

*Primary Examiner* — Peggy A. Neils
(74) *Attorney, Agent, or Firm* — McDermott Will & Emery LLP

(57) ABSTRACT

A camera flash module is provided. The camera flash module may include a lens having a single refractive surface and a reflector that adjusts a direction of a light emitted from the lens. Accordingly, maintaining of a distance between a light emitting device and the lens may not be needed and thus, the camera flash module may be readily manufactured and a productivity may be improved. An error rate caused by distortion in a tilt and an optical axis between the light emitting device and the lens may be reduced. The reflector may adjust a direction of a light emitted from the lens and thus, an emission pattern requested by a camera may be satisfied, and a velocity of light may be improved. The reflector may surround the lens and thus, may prevent the lens from being detached from a light emitting device package body when an external impact occurs.

9 Claims, 5 Drawing Sheets

CAMERA FLASH MODULE

CROSS-REFERENCE TO RELATED APPLICATION

This application claims the benefit of Korean Patent Application No. 10-2011-0065442, filed on Jul. 1, 2011, in the Korean Intellectual Property Office, the disclosure of which is incorporated herein by reference.

BACKGROUND

1. Field of the Invention

The present invention relates to a camera flash module, and more particularly, to a camera flash module that may adjust a direction of a light so as to match an angle of view of a camera.

2. Description of the Related Art

As digital cameras have been popular, various mobile communication terminals containing a built-in small-digital camera have been manufactured and provided in the market.

Digital cameras, built-in cameras of mobile terminals, and the like may contain a flash that provides an amount of light required for photographing images at night. A camera flash module is contained in most mobile communication terminals that are currently produced, so that users may clearly photograph images at night.

At least one light emitting device is mounted on a printed circuit board (PCB) surface, in the camera flash module, so that a light source emits a light to an external side through a condensing lens set on a mobile terminal, and the at least one light emitting device may emit a light using power supplied from the mobile terminal. Recently, a light emitting diode (LED) has drawn attention for use as a flash light source.

To effectively utilize a light emitting device in the camera flash module, the camera flash module needs to adjust a light to match an angle of view of a camera, in addition to simply emitting a light. Due to a characteristic of a camera, there is a difference between a range of a light emitted from a light emitting device and a range of a light required by the camera and thus, the range of light emitted by the light emitting device may be adjusted through a lens.

Since an illumination angle of the light emitting device is greater than an angle of view of a camera, when only the light emitting device is used, a ratio of an incident light in a photograph area of the camera to a light emitted from the light emitting device is significantly small, and a light efficiency decreases. Therefore, a plurality of lenses is included on a foreside of the light emitting device.

When a Fresnel lens that minimizes a size of a lens is used, a light emitted from a light emitting device may be difficult to be controlled and thus, a light efficiency may decrease. Also, when a lens is provided in a circular shape, a light passing through the lens is emitted in a circular shape and thus, the light emitted in a circular shape may not be optimized for the photograph area of the camera which is provided in a quadrangular shape. Accordingly, a light loss may significantly occur.

Accordingly, many lights are out of the photograph area of the camera and thus, a light efficiency may be low. Also, little light is illuminated to a corner of the camera and thus, a brightness uniformity may decrease and a quality of an image may decrease.

Therefore, to effectively utilize a light emitted from the light emitting device, a lens included in the camera flash module may include a refraction unit to control a light from the foreside of the light emitting device and a total reflection unit to effectively use a light from a side of the light emitting device.

A current light emitting device flash lens may be classified into two groups: a light emitting flash lens having a circular side total reflection unit and a light emitting flash lens having a quadrangular side total reflection. Even though the circular side total reflection unit may be readily manufactured, a performance may be deteriorated since a size of a screen of a camera has a width to height ratio of 4:3, which is the characteristic of cameras. Even through the quadrangular side total reflection unit may be difficult to be manufactured, the quadrangular side total reflection unit may be manufactured to fit the size of the screen of the camera. Also, an amount of illuminance in a required area is greater than the circular side total reflection and thus, the quadrangular side total reflection unit is preferred.

A ratio of an ambient light to a central illuminance at 1 meter (m) away from the light emitting flash may be important and the ratio may be referred to as a brightness ratio or a light intensity uniformity. When a center is significantly bright and an ambient is significantly dark, edges of a photographed image may be developed to be dark and thus, the ratio of the ambient light to the central illuminance needs to be greater than or equal to 60%.

The light emitting device flash lens may be classified into two types: an integrated type including a light emitting device and a lens as one package and a separable type including a light emitting device and a lens which are separable from each other.

In the integrated type, a light emitting device and a lens are packaged as one and thus, a degree of distortion in a tilt and an optical axis between the light emitting device and the lens is significantly low. However, an additional window is included in the mobile terminal and thus, corresponding components may also be added.

In the separable type, a lens is formed on a window surface as a Fresnel lens type so that the window of the mobile terminal may provide a function of a lens and thus, a number of components used in the separable type may decrease when compared to the integrated type. However, a distance between a light emitting device and the lens is significantly greater than the integrated type and thus, energy loss may occur. Also, a degree of distortion in a tilt and an optical axis between the light emitting device and the window lens is high and thus, an assembly error rate may increase.

Demand from the market for a flash that is readily managed and provides a great amount of light for a high-resolution camera is high and thus, the integrated type is preferred. However, the integrated flash lens has a drawback in its manufacturing process. A distance between a light emitting device and a lens may need to be constant so that a light emitted to an area that requires light may satisfy the requirement. However, a camera flash module lens is made from silicon that is robust against heat and has a low strength and thus, assembly of the light emitting device and the lens may be difficult and maintaining of the distance between the light emitting device and the lens to be constant may also be difficult. Therefore, there is a desire for a camera flash module having a structure that does not need to maintain the distance to be constant.

SUMMARY

An aspect of the present invention provides a camera flash module that may adjust a direction of a light to match an angle of view of a camera.

According to an aspect of the present invention, there is provided a camera flash module, including a light emitting device package body in which a cavity is formed, a light emitting device mounted in the cavity, a lens formed on the light emitting device package body and having a refractive surface convex to a direction in which an incident light from the light emitting device is emitted, and a reflector fastened to the light emitting device package body, and adjusting a direction of a light emitted from the lens.

The lens may include an upper portion and a lower portion formed to be integrated, the lower portion of the lens may be received in the cavity and may surround the light emitting device, and a lower surface of the upper portion of the lens may be wider than a width of the cavity.

A portion of the upper portion of the lens may cover the light emitting package body.

The refractive surface may be formed on the upper portion of the lens and a number of the formed refractive surface is one.

Cross-sections of the cavity, the lower portion of the lens, and the reflector are provided in a quadrangular shape.

A plurality of recesses may be formed on the light emitting device package body, and a plurality of protrusions to be inserted to the plurality of recesses may be formed on the reflector.

The plurality of recesses may be formed along edges of the light emitting package body.

The plurality of recesses may be formed on corners of the light emitting package body.

The light emitting device package body and the reflector may be fastened with a screw.

An internal surface of the reflector may be coated with a reflective material.

A thickness of the reflector may become thinner as a position at which the thickness is measured is moved farther away from the light emitting device package body.

Additional aspects, features, and/or advantages of the invention will be set forth in part in the description which follows and, in part, will be apparent from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

Throughout the specifications, when it is described that each of a layer, a side, a chip, and the like is formed "on" or "under" a layer, a side, a chip, and the like, the term "on" may include "directly on" and "indirectly on," and the term "under" may include "directly under" and "indirectly under." A standard for "on" or "under" of each element may be determined based on a corresponding drawing.

A size of each element in drawings may be exaggerated for ease of descriptions, and does not indicate a real size.

Figure 1:
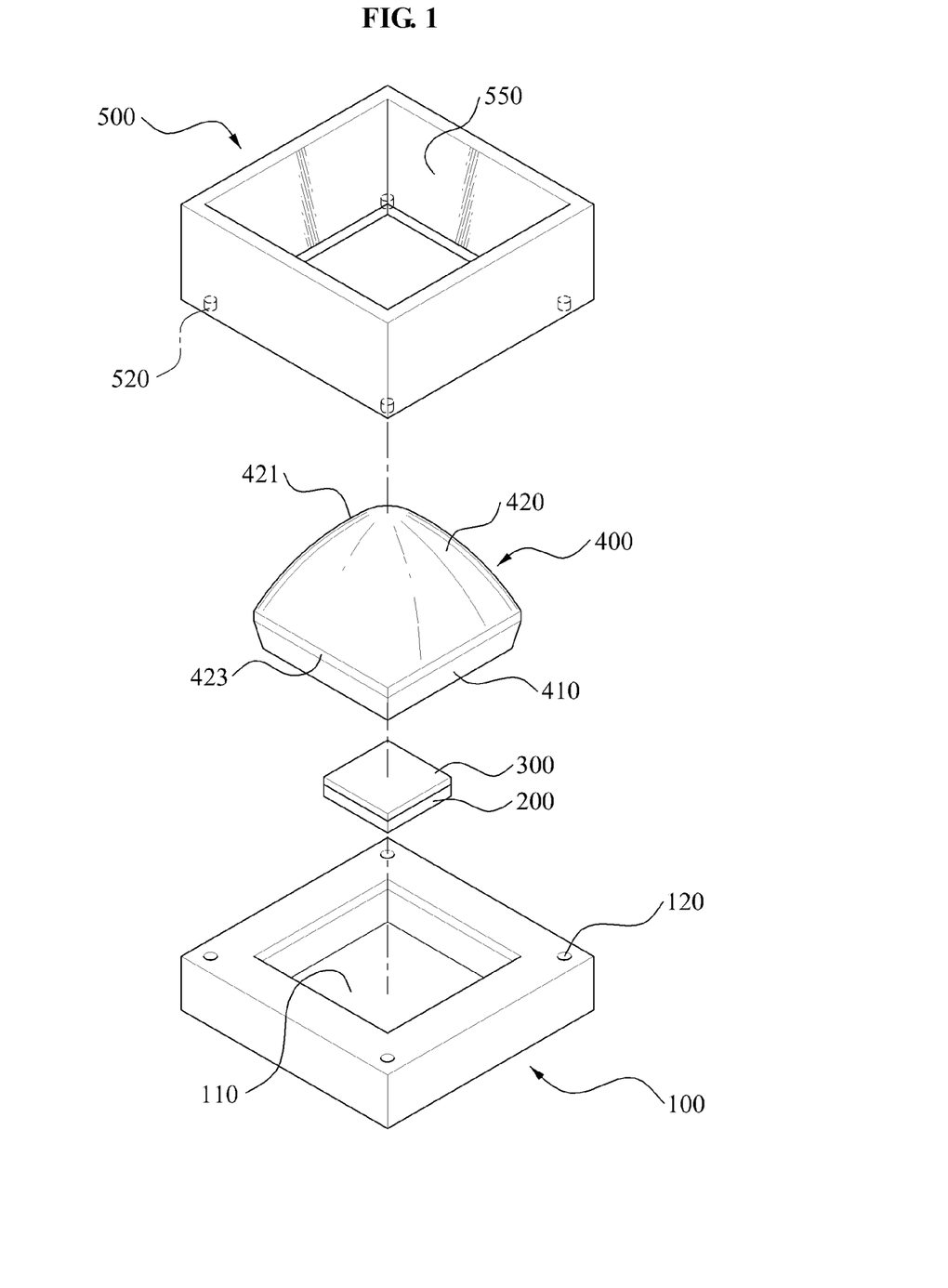
FIG. 1 is an exploded perspective view of a camera flash module according to an embodiment of the present invention.
Figure 2:
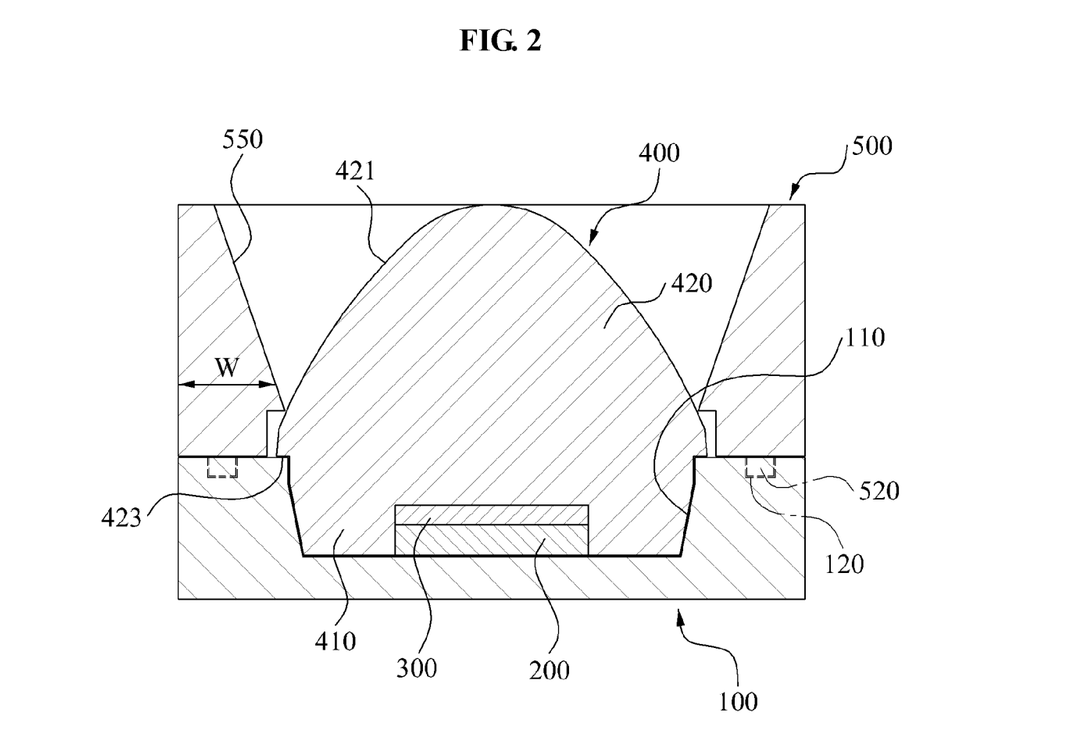
FIG. 2 is a cross-sectional view of a camera flash module according to an embodiment of the present invention.

FIG. 1 illustrates a camera flash module according to an embodiment of the present invention, and FIG. 2 illustrates a cross-section of a camera flash module according to an embodiment of the present invention.

Referring to FIGS. 1 and 2, the camera flash module includes a light emitting device package body 100, a light emitting device 200, a fluorescent substance layer 300, a lens 400, and a reflector 500.

A cavity 110 may be formed in the light emitting device package body 100. A cross-section of the cavity 110 may be provided in a quadrangular shape. That is, the cavity 110 may be provided in a square or rectangular shape. Also, the cavity 110 may be provided in a circular shape by processing edges of the square or rectangular cavity. A light emitted from the light emitting device 200 including a circular cavity may be more effectively reflected.

The light emitting device 200 may be mounted in the cavity 110. A scheme of mounting the light emitting device 200 in the cavity 110 may include a flip chip bonding scheme, and soldering or a conductive adhesive may be used to perform the flip chip bonding scheme. Also, the light emitting device 200 may be mounted in the cavity 110 based on a die bonding scheme. The light emitting device package body 100 may be manufactured from a material having a superior heat protection characteristic.

A plurality of recesses 120 in which a plurality of protrusions 520 are received may be formed on the light emitting device package body 100. The plurality of recesses 120 of the light emitting device package body 100 and the plurality of protrusions 520 of the reflector 500 will be described in detail when fastening of the reflector 500 to the light emitting device package body 100 is described.

The light emitting device 200 may include a first conductive semiconductor layer, an active layer, a second conductive semiconductor layer, and an electrode. Here, n-doping may be performed with respect to the first conductive semiconductor layer, and an electron may move to the active layer through the first conductive semiconductor layer.

The active layer may be formed on the first conductive semiconductor layer. The active layer may be formed as a layer structure in which a quantum barrier layer and a quantum well layer are alternately layered, so that an electron and a hole may be re-bonded and emit a light. A composition of the active layer may be changed based on a desired emission wavelength.

The second conductive semiconductor layer may be formed on the active layer. Here, p-doping may be performed with respect to the second conductive semiconductor layer, and a hole may move to the active layer through the second conductive semiconductor layer.

A transparent electrode may be formed on the second conductive semiconductor layer. The transparent electrode may be configured as a transparent metallic layer, for example, nickel/gold (Ni/Au), or may be configured as a conductive oxide, for example, indium tin oxide (ITO). A p-type electrode may be formed on the transparent electrode, and an n-type electrode may be formed on the first conductive semiconductor layer. The p-type electrode and the n-type electrode may be formed from various metallic materials, for example, titanium (Ti), aluminum (Al), and the like.

A hole may be supplied through the p-type electrode, and an electron may be supplied through the n-type electrode. The hole and the electron may be bonded in the active layer and may generate light energy. The light emitting device 200 may be an ultraviolet light emitting device or a blue light emitting device, based on a wavelength of an emitted light.

The fluorescent substance layer 300 may be formed on the light emitting device 200. The fluorescent substance layer 300 may surround the light emitting device 200. A light emitted from the light emitting device 200 may pass through the fluorescent substance layer 300 and may proceed to the lens 400. The fluorescent substance layer 300 may perform scattering of a light from the light emitting device 200 so as to perform color transformation. For example, a blue light emitted from the light emitting device 200 may be transformed to a yellow light, a green light, or a red light by passing through the fluorescent substance layer 300, so that a white light may be emitted to an external side. The fluorescent substance layer 300 may be formed to be a thin layer having a constant thickness. Since the fluorescent substance layer 300 is configured as a plane having a constant thickness, the fluorescent substance may evenly transform a light emitted from the light emitting device 200, and may reduce a color dispersion.

The lens 400 may be formed on the light emitting device package body 100. The lens 400 may include an upper portion 420 and a lower portion 410. The lower portion 410 of the lens 400 may be received in the cavity 110 of the light emitting device package body 100. The lower portion 410 of the lens 400 may be received in the cavity 110, and may surround the light emitting device 200 and the fluorescent substance layer 300. A cross-section of the lower portion 410 of the lens 400 may be provided in a quadrangular shape, like the cavity 110. That is, the lower portion 410 of the lens 400 may be in a square shape or a rectangular shape, and the lens 400 may be in a shape of a dome of which a lower portion is in a quadrangular shape. Therefore, a light adjusted to match an angle of view of a camera may be emitted.

A light emitted from the light emitting device 200 may pass through the fluorescent substance layer 300, and may be emitted to an external side. The upper portion 420 of the lens 400 may have a refractive surface 420 convex to a direction in which an incident light from the light emitting device 200 is emitted. The upper portion 420 of the lens 400 may have a predetermined radius curvature to adjust a far field beam distribution of a light to be emitted to an external side. The refractive surface 421 may be formed on the upper portion 420 of the lens 400 and a number of the formed refractive surface may be one. Therefore, maintaining of a distance between the lens 400 and the light emitting device 200 to be constant may not be needed and thus, the camera flash module may be readily manufactured.

A lower surface of the upper portion 420 of the lens 400 may have a wider width than the cavity 110. A portion of the lower surface of the upper portion 420 of the lens 400 may cover the light emitting package body 100. That is, the lower surface of the upper portion 420 of the lens 400 may include an extended portion 423 extended from a top side of the cavity 110 in a horizontal direction, and the extended portion 423 may be in contact with the light emitting device package body 100. Therefore, even through an external impact occurs, the lens 400 may be prevented from being detached from the light emitting device package body 100.

The lower portion 410 and the upper portion 420 may be formed to be integrated. The lower portion 410 received in the cavity 110 may be formed to be integrated with the upper portion 420 of which at least one portion 423 covers the light emitting device package body 100. The upper portion 420 of the lens 400 and the lower portion 410 of the lens 400 may be formed to be integrated based on a transfer molding scheme.

Accordingly, maintaining of a distance between the light emitting device 200 and the lens 400 may not be needed and thus, the camera flash module may be readily manufactured and a productivity may be improved. Also, an error rate associated with distortion in a tilt and an optical axis during assembly of the light emitting device package body 100 and the lens 400 may decrease.

The reflector 500 may reflect a light emitted from the lens 400. The reflector 500 may be manufactured from a material having a high reflection rate. The reflector 500 may be manufactured from a metallic material, and a material used for the manufacturing is not limited to a predetermined metal, when the material has a high reflection rate. Also, the reflector 500 may be manufactured from the same material as the light emitting device package body 100. In addition, an internal surface 550 of the reflector 500 may be coated with a reflective material having a high reflection rate, and may be coated with the reflective material in a shape of a film. Accordingly, a reflection rate of a light emitted from the lens 400 may be improved.

The reflector 500 may adjust a direction of a light emitted from the lens 400. A thickness (W) of the reflector 500 may become thinner as a position at which W is measured is moved farther away from the light emitting device package body 100. A distance between the internal surface 550 of the reflector 500 become farther from the upper portion 420 of the lens 400 as a position at which the distance is measured is moved farther away from the light emitting device package body 100. The internal surface 550 of the reflector 500 may be formed to be inclined towards the light emitting device package body 100.

The internal surface 550 of the reflector 500 may be formed in a rectilinear shape or a curved shape. The internal surface 550 of the reflector 500 may be formed in varied shapes to narrow an emission angle of a light emitted from the lens 400. A light emitted from the lens 400 may have an emission angle that matches an angle of view of a camera. Accordingly, a brightness ratio may be changed based on desired specifications of the camera and thus, a light intensity uniformity may be secured.

Therefore, the reflector 500 may adjust a direction of a light emitted from the lens 400 and thus, an emission pattern required by the camera may be satisfied and a velocity of light may be improved.

The reflector 500 may be fastened to the light emitting device package body 100. A cross-section of the reflector 500 may be provided in a quadrangular shape. The reflector 500 may be in a square shape or a rectangular shape. Accordingly, a light matching the angle of view of the camera may be emitted. Hereinafter, a process of fastening of the reflector 500 and the light emitting device package body 100 will be described with reference to drawings.

Figure 3A:
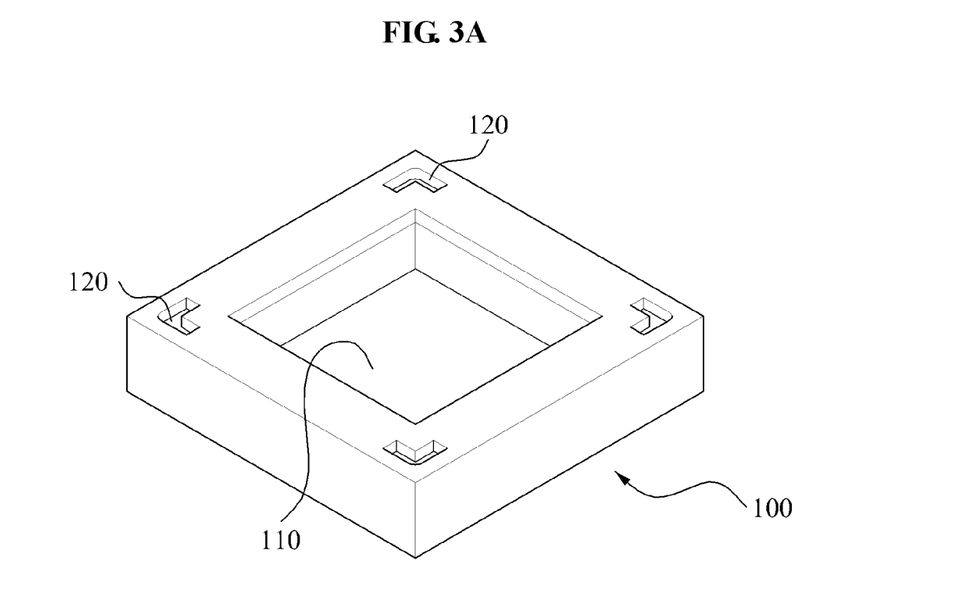
FIG. 3A is a perspective view of a light emitting device package body in a camera flash module according to an embodiment of the present invention.
Figure 3B:
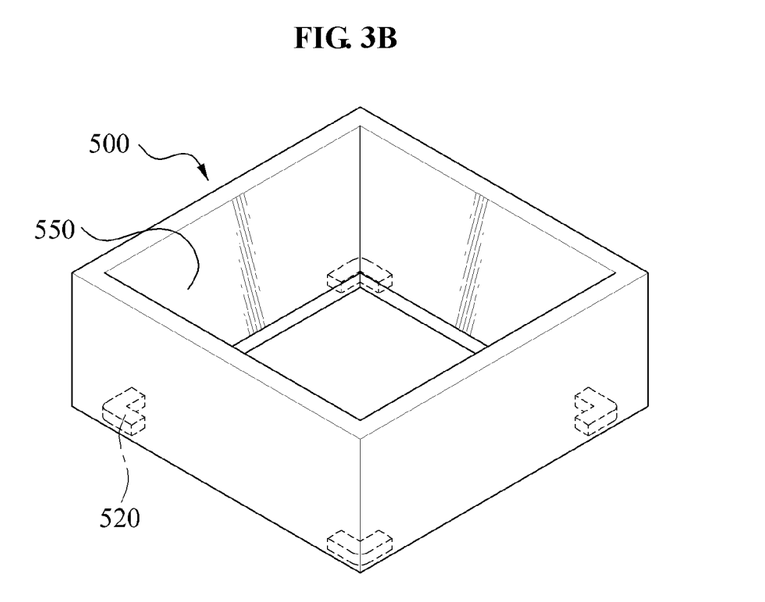
FIG. 3B is a perspective view of a reflector corresponding to the light emitting device package body of FIG. 3A according to an embodiment of the present invention.

FIG. 3A illustrates the light emitting device package body 100 in a camera flash module according to an embodiment of the present invention. FIG. 3B illustrates a reflector 500 corresponding to the light emitting device package body 100 of FIG. 3A according to an embodiment of the present invention.

Figure 4A:
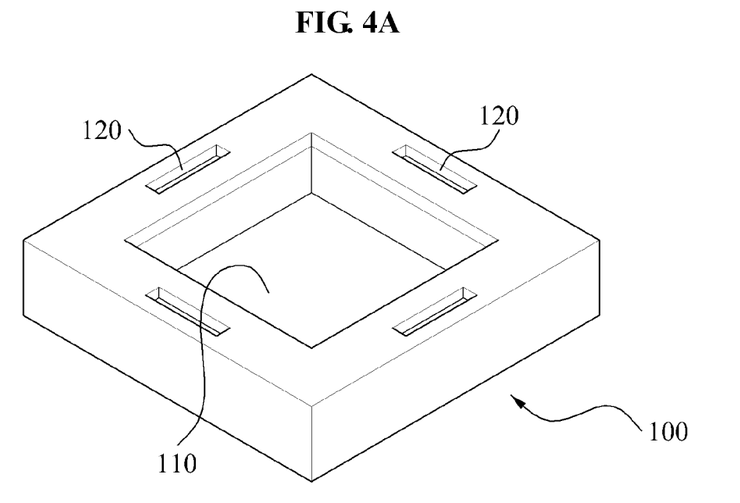
FIG. 4A is a perspective view of a light emitting device package body in a camera flash module according to an embodiment of the present invention.
Figure 4B:
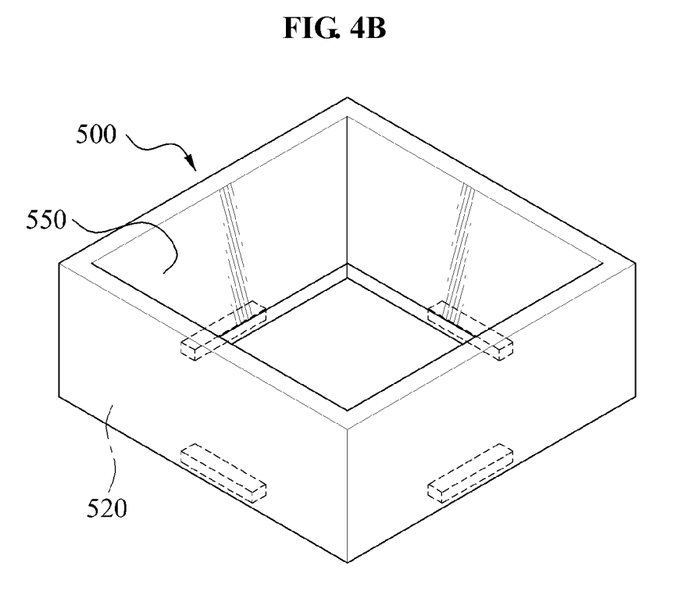
FIG. 4B is a perspective view of a reflector corresponding to the light emitting device package body of FIG. 4A according to an embodiment of the present invention.

FIG. 4A illustrates the light emitting device package body 100 in a camera flash module according to an embodiment of the present invention. FIG. 4B illustrates the reflector 500 corresponding to the light emitting device package body 100 of FIG. 4A according to an embodiment of the present invention.

Referring to FIGS. 3A through 4B, the plurality of recesses 120 may be formed on the light emitting device package body 100, and the plurality of protrusions 520 to be inserted into the plurality of recesses 120 may be formed on the reflector 500. The reflector 500 may be fastened to the light emitting device package body 100 using an adhesive disposed between the plurality of recesses 120 and the plurality of protrusions 520. A shape of a protrusion 520 corresponding to a recess 120 may be provided in varied shapes, for example, a circular shape, a triangular shape, a quadrangular shape, and the like. The shape of the protrusion 520 may not be limited, when the reflector 500 is readily fastened to the light emitting device package body 100.

In the camera flash module according to an aspect of the present invention, the plurality of recesses 120 may be formed on corners of the light emitting device package body 100 as shown in FIG. 3A, and the plurality of protrusions 520 may be formed to correspond to the plurality of recesses 120 as shown in FIG. 3B. Also, the plurality of recesses 120 may be formed along edges of the light emitting device package body 100 as shown in FIG. 4A, and the plurality of protrusions 520 may be formed to correspond to the plurality of recesses 120 as shown in FIG. 4B. In addition, the plurality of recesses 120 may be configured as a single integrated recess, that is, a single recess may be formed along edges of an upper surface of the light emitting device package body 100. Accordingly, a position in which the plurality of recesses 120 and the plurality of protrusions 520 are formed may be variously changed, and the position may not be limited, when the reflector 500 is readily fastened to the light emitting device package body 100.

In the camera flash module according to an aspect of the present invention, the reflector 500 may be fastened to the light emitting device package body 100 using a screw. In this example, to fasten the reflector 500 to the light emitting device package body 100, various fastening units, for example, a screw and the like may be used.

The reflector 500 may be fastened to the light emitting device package body 100 by surrounding the lens 400 and thus, may prevent the reflector 500 from being detached from the light emitting device package body 100 when an external impact occurs.

Figure 5:
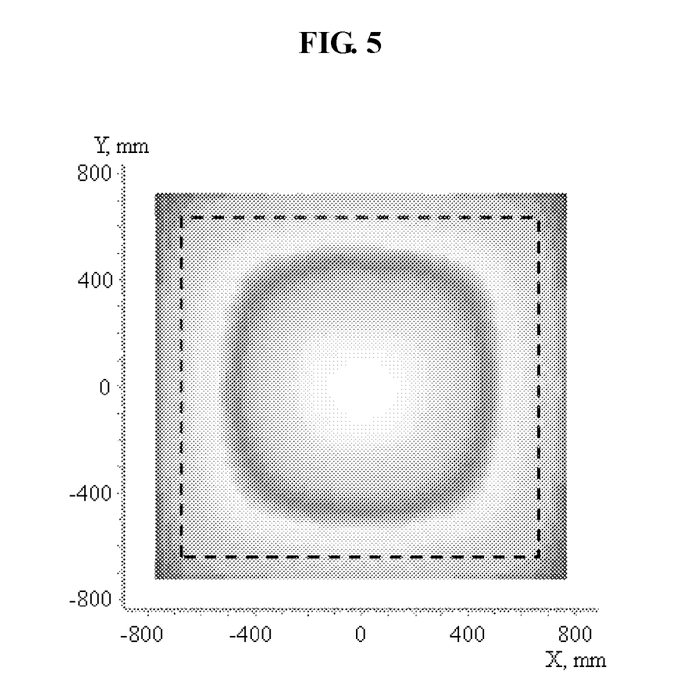
FIG. 5 is a graph to describe an emission pattern using a camera flash module according to an embodiment of the present invention.

FIG. 5 illustrates an emission pattern using a camera flash module according to an embodiment of the present invention.

Referring to FIG. 5, a rectangle formed by a dotted line denotes an angle of view of a camera, and light is distributed within the angle of view of the camera, when the camera flash module is used. Particularly, a brightness ratio may satisfy more than 60% to 70% of a central illuminance.

The camera flash module may include a lens having a single refractive surface and a reflector that adjusts a direction of a light emitted from the lens. Accordingly, maintaining of a distance between the light emitting device and the lens to be constant may not be needed and thus, the camera flash module may be readily manufactured and a productivity may be improved. Also, an error rate associated with distortion in a tilt and an optical axis during assembly of the light emitting device package body and the lens may decrease.

The reflector may adjust a direction of a light emitted from the lens and thus, an emission pattern required by the camera may be satisfied and a velocity of light may be improved. Also, the reflector may surround the lens and thus, may prevent the lens from being detached from the light emitting device package body when an external impact occurs.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A camera flash module, comprising:
a light emitting device package body in which a cavity is formed;
a light emitting device mounted in the cavity, wherein the light emitting device has opposing first and second main surfaces and opposing lateral surfaces joining the first and second main surfaces, and the light emitting device is mounted to the package body through the first main surface;
a lens formed on the light emitting device package body and having a refractive surface convex to a direction in which an incident light from the light emitting device is emitted, wherein the lens comprises an upper portion and a lower portion formed to be integrated, the lower portion of the lens is received in the cavity and surrounds the opposing lateral surfaces of the light emitting device;
a reflector fastened to the light emitting device package body, and adjusting a direction of a light emitted from the lens,
wherein cross-sections of the cavity, the lower portion of the lens, and the reflector are provided in a quadrangular shape; and
a plurality of recesses is formed on the light emitting device package body; and
a plurality of protrusions to be inserted to the plurality of recesses is formed on the reflector,
wherein the plurality of recesses is formed on corners of the light emitting package body.

2. The camera flash module of claim 1, wherein a lower surface of the upper portion of the lens is wider than a width of the cavity.

3. The camera flash module of claim 2, wherein a portion of the upper portion of the lens covers the light emitting package body.

4. The camera flash module of claim 2, wherein the refractive surface is formed on the upper portion of the lens and a number of the formed refractive surface is one.

5. The camera flash module of claim 1, wherein the light emitting device package body and the reflector are fastened with a screw.

6. The camera flash module of claim 1, wherein an internal surface of the reflector is coated with a reflective material.

7. The camera flash module of claim 1, a thickness of the reflector becomes thinner as a position at which the thickness is measured is moved farther away from the light emitting device package body.

8. The camera flash module of claim 1, further comprising a fluorescent substance layer comprising a fluorescent substance disposed on the second main surface of the light emitting device.

9. The camera flash module of claim 1, wherein the lower portion of the lens contacts a bottom of the cavity.

* * * * *